United States Patent [19]

Miyazono et al.

[11] Patent Number: 4,758,645
[45] Date of Patent: Jul. 19, 1988

[54] PREPARATION OF GRAFT COPOLYMER AND PAINT USE THEREOF

[75] Inventors: Tadafumi Miyazono; Yoshio Eguchi, both of Osaka; Akiharu Ogino, Tokyo; Haruhiko Sawada, Kanagawa; Yoshitaka Okude, Osaka, all of Japan

[73] Assignee: Nippon Paint Co., Ltd., Osaka, Japan

[21] Appl. No.: 90,695

[22] Filed: Aug. 28, 1987

Related U.S. Application Data

[62] Division of Ser. No. 711,801, Mar. 11, 1985, Pat. No. 4,714,634.

[30] Foreign Application Priority Data

May 28, 1984 [JP] Japan ............................ 59-108164

[51] Int. Cl.$^4$ .................. C08G 63/00; B05D 3/02; B05D 1/36; B32B 27/06
[52] U.S. Cl. .................. 527/311; 527/312; 527/313; 527/314; 526/238.2; 526/238.21
[58] Field of Search ............... 527/311, 312, 313, 314; 526/238.2, 238.21

[56] References Cited

U.S. PATENT DOCUMENTS 4,435,531 3/1984 Nakayama et al. ................. 527/311

Primary Examiner—Delbert R. Phillips
Assistant Examiner—Nathan M. Nutter
Attorney, Agent, or Firm—Wenderoth, Lind & Ponack

[57] ABSTRACT

Preparation of a graft copolymer prepared by reacting a cellulose ester and a mono- or di-ester of maleic or a fumaric acid, thereby obtaining a cellulose derivative bearing a polymerizable double bonding, and then copolymerizing said cellulose derivative with other copolymerizable monomer(s). The invention also includes a coating composition based on thus obtained graft copolymer.

8 Claims, No Drawings

PREPARATION OF GRAFT COPOLYMER AND PAINT USE THEREOF

This is a divisional application of U.S. application Ser. No. 711,801, filed Mar. 11, 1985, now U.S. Pat. No. 4,714,634.

FIELD OF INVENTION

The present invention relates to a method for preparing graft copolymers of cellulose derivatives with other copolymerizable monomers. The invention also concerns a coating composition based on the graft copolymer thus obtained.

BACKGROUND OF THE INVENTION

Recently, attention has been concentrated, in the paint industry, to a resinous copolymer of cellulose acetate butyrate (hereinafter referred to CAB) and vinyl monomer, having excellent drying properties, hardness and other desired properties.

To obtain such resinous copolymer, various methods have been proposed including:

(1) A method wherein CAB is directly copolymerized with vinyl monomer(s), using an organic peroxide as a polymerization initiator, as shown, for example, in Japanese Patent Application Kokai Nos. 115126/74, ibid 133472/80, ibid 54301/80, Japanese Patent Publication Nos. 37683/75, ibid 5659/76, ibid 5660/76 and ibid 2978/83.

(2) A method wherein specified amounts of acid, acid anhydride, acid chloride or isocyanate are first reacted with the hydroxyl groups of CAB, thereby introducing to the CAB molecule mercapto groups, a group from which hydrogen may be easily drawn or unsaturation bonding, and then vinyl monomer(s) is (are) graft-polymerized, as given, for example, in Japanese Patent Application Kokai Nos. 80192/73; ibid 48030/75; ibid 48031/75; Japanese Patent Publication No. 8105/80.

(3) A method wherein graft polymerization is carried out using a $Co^{66}$ or $Ce^{+++}$ salt.

However, in any of the known methods, there is a serious drawback in that the grafting rate is extremely low. Therefore, when the resinous solution thus obtained is applied and dried, there always results a coating with white blooming. Moreover, the resinous product has poor compatibility with other resins as, for example, acrylic resins, polyester resins, high styrene containing acrylic resins and the like, and the product has only limited solubility in various solvents, such as toluene, xylene and other paint-use solvents.

The above is especially true when CAB is reacted with maleic anhydride or maleic acid, in that no CAB graft copolymer suitable for paint use has been obtained.

The inventors, having paid attention to the fact that CAB has a number of ester bondings, such as an acetate and a butyrate, besides hydroxyl groups, have endeavored to utilize these functional groups for the introduction of polymerizable unsaturation bonding and have succeeded in finding an ingenious way of reacting cellulose ester and mono- or diester of maleic or fumaric acid for that purpose. On the present basis of this finding, the invention has been made.

SUMMARY OF THE INVENTION

According to the present invention, there is provided a method for preparing a graft copolymer comprising copolymerizing a cellulose derivative bearing copolymerizable double bonding and copolymerizable monomer(s), characterized in that the said cellulose derivative is obtained by the reaction of the cellulose ester and mono- or di-ester of maleic or fumaric acid.

The invention also provides a coating composition based on the graft copolymer thus prepared.

PREFERRED EMBODIMENTS OF THE INVENTION

Since maleic or fumaric esters are wanting in self-polymerization tendencies, they can be safely used in reactions at higher temperatures for a longer duration of time, without the fear of gel formation.

When a cellulose ester is reacted, directly or in an inert organic solvent, with a mono- or a di-ester of maleic or fumaric acid under heating and optionally in the presence of a catalyst as dibutyl tin oxide, various reactions, consisting mainly of ester-exchange reactions between the ester moiety of said cellulose ester that of maleic or fumaric acid and accompanied by reactions between the hydroxyl group of the cellulose ester and the ester moiety of said acid and the between hydroxyl group of the cellulose ester and carboxyl of the half ester of said acid, may be carried out and thus the copolymerizable double bonding can be easily and effectively introduced in the cellulose molecule.

The progress of such reactions may be easily detected by checking the UV absorbance through liquid chromatography using a UV absorption photometer or Gel-permeation chromatography (GPC) and tracing the double bonding introduced. When the progress of the reaction was actually examined with the aforesaid method in both cases of direct reaction between the cellulose ester and the maleic acid or maleic anhydride and of the reaction between cellulose ester and di- or mono-ester of maleic or fumaric acid at (equimolar quantities, and at the same temperature and same reaction time), it was found that the former showed a belated increase in UV absorbance, indicating an extremely slow progress of reaction, than the latter.

The same was also supported by the following fact. That is, when the respective resinous varnish was applied, the former varnish gave a white turbid coating, whereas the latter a clear uniform coating.

This may be interpreted as follows. In the latter case, there was a higher reaction rate and hence a higher grafting rate, which might be the reason for the resulting clear uniform coating.

Even in the case of reaction with maleic acid or maleic anhydride, one may contemplate using a larger quantity of such acid to get the same extent of high reaction rate as obtained with the mono- or di-ester of fumaric acid or the like. However, in that case, since a considerable quantity of unreacted maleic acid or maleic anhydride remains in the system and the resulted cellulose product would possess an end carboxyl group, there results a resinous product with a very high acid value, which might cause the turbidity and clouding of the varnish. This is also undesired from the standpoint of weather resistance of the coating because it causes yellowing, white blooming, cracking or the like.

Thus, in the present invention, a cellulose ester is first reacted with a mono- or a di-ester of maleic or fumaric acid, which is one of the characteristic features of the invention. As the starting material, any of the cellulose esters may be satisfactorily used, as for example, cellulose acetate, cellulose acetate propionate, cellulose acetate butyrate and the like. However, from the standpoint of solubility, viscosity and the like, preference is given to cellulose acetate butyrate and especially to members having an acetylation degree of 1 to 34% by weight, a butyrylation degree of 16 to 60% by weight and a viscosity measured by ASTM-D-134315 of 0.005 to 20 seconds. More specifically, the following commercialized products may be specifically, advantageously used: CAB-551-0.01, CAB-551-0.2, CAB-531-1, CAB-500-1, CAB-381-0.1, CAB-381-0.5, CAB-381-20 and the like (Trade Marks of cellulose acetate butyrates manufactured by Eastman Chemical Products).

As the mono- or di-ester of maleic or fumaric acid, one may use mono-methyl maleate, mono-ethyl maleate, mono-butyl maleate, 2-ethyl hexyl maleate, dimethyl maleate, diethyl maleate, dibutyl maleate, di-2-ethyl hexyl maleate, dimethyl fumarate, di-ethyl fumarate, dibutyl fumarate, di-2-ethyl hexyl fumarate and the like. These are, however, only examples and one may use any of the mono- or di-esters of these acids.

Next, in the present invention, the thus obtained cellulose derivative having a copolymerizable double bonding is reacted with other polymerizable monomer(s) to give the desired graft copolymer.

As the polymerizable monomer, any of the vinyl series monomers having $\alpha,\beta$-ethylenically unsaturation bonding may be used. Examples of the monomers include the following:

(1) vinyl monomers such as styrene, vinyl toluene, α-methyl styrene, vinyl acetate, acrylonitrile, methacrylonitrile and the like,
(2) alkyl or cycloalkyl esters of acrylic or methacrylic acid such as methyl acrylate, methyl methacrylate, ethyl acrylate, ethyl methacrylate, n-butyl acrylate, n-butyl methacrylate, iso-butyl acrylate, iso-butyl methacrylate, t-butyl acrylate, t-butyl methacrylate, cyclohexyl acrylate, cyclohexyl methacrylate, 2-ethyl hexyl acrylate, 2-ethyl hexyl methacrylate, lauryl acrylate, lauryl methacrylate, stearyl acrylate, stearyl methacrylate and the like,
(3) hydroxyalkyl esters of acrylic or methacrylic acid such as 2-hydroxyethyl acrylate, 2-hydroxyehtyl methacrylate, hydroxypropyl acrylate, hydroxypropyl methacrylate and the like,
(4) $\alpha,\beta$-ethylenically unsaturated carboxylic acid such as acrylic acid, methacrylic acid, itaconic acid, crotonic acid and the like,
(5) acrylamides or methacrylamides such as acrylamide, methacrylamide, N-methylacrylamide, N-ethyl methacrylamide, N-methylol acrylamide, N-methylol methacrylamide, N,N-dimethyl acrylamide, N,N-dimethyl methacrylamide, N-n-butoxymethyl acrylamide and the like,
(6) glycidyl group bearing vinyl monomers such as glycidyl acrylate, glycidyl methacrylate, allyl glycidyl ether and the like.

These monomers may be used each singularly or in the combination of 2 and more in various ratio depending on the film properties and coating applications as desired. The weight ratio of said CAB derivative to said monomer(s) may also be varied in a considerable range and however, it is usually within the range of 1 to 95 weight % of the former: 99 to 5 weight % of the latter.

The copolymerization is usually carried out in a solvent and in the presence of a radical initiator.

Examples of such solvents, which may be used each singularly or in any combination, are benzene; alkyl benzenes like toluene and xylene; alcohols like n-butanol, isobutanol and the like; acetic acid esters; ketones and the like. Examples of radical initiators are peroxides such as benzoyl peroxide, lauroyl peroxide, dicumyl peroxice and the like; hydroperoxide initiators such as t-butyl hydroperoxide, cumene hydroperoxide and the like; ketone peroxides and per-ester initiators; azo series initiators such as azobis isobutyronitrile and the like.

In this reaction, one may use a conventional chain transfer agent, too. The copolymerization may be carried out according to normal procedures which per se are well known in the art. Thus, in the present method, a copolymerizable unsaturation bonding originating in the mono- or the di-ester of maleic or fumaric acid can be introduced in a higher reaction rate into CAB, to which the vinyl monomer is effectively grafted through radical polymerization.

Therefore, the reaction product is characterized by having a higher grafting rate, which makes for good compatibility with high styrene containing acrylic resin and other paint use resins, and which is excellent in solubility in solvents. Further more, even if it is applied alone as a clear coating composition, an excellent clear film can be obtained. In that sense, the present resin should be clearly distinguished from the conventional CAB graft copolymer.

In the second aspect of the invention, there is provided a coating composition to be used as a base coat in a two-coat one-bake coating system comprising an acrylic graft copolymer obtained by reacting a cellulose ester with a mono- or a di-ester of maleic or fumaric acid, thereby introducing a copolymerizable double bonding into the cellulose molecule, and thereafter copolymerizing the same with other polymerizable monomer(s), and a crosslinking agent.

In a 2-coat 1-bake coating system, film coatings are prepared by applying a base coat, applying, without baking, a clear coat and then subjecting to a baking operation. In that base coating composition, metallic powders, such as aluminum are usually contained and therefore, in order to have a good control of the arrangement of said powders in the base coat, a device has to be made to bring the viscosity of the applied and uncured base coating to a higher level, thereby preventing the possible movement of said powders in the coating. At the same time, the clear coating should preferably be based on a resin which is incompatible with that of base coat and/or solvent to which the base coat can hardly be dissolved.

Recently, there is interest in a base coat blended with a cellulose derivative because of the rapid increase in viscosity of its applied coating and it is not dissolved by the top coat composition. However, heretofore proposed cellulose derivatives have been, in general, quite poor in compatibility with acrylic or amino resins to be blended therewith and hence have a drawback in that the blended composition or coating becomes turbid or separates during storage thereof.

As an alternative, the technique of using a graft copolymer of a acrylic resin and cellulose derivative as a resinous vehicle has also been proposed.

However, the proposed graft copolymers, previously used though giving somewhat improved results as compared with those of the mere mechanical blends with cellulose derivatives, do not fully solve the aforesaid problems and further improvements are still needed for these types of resins.

The inventors have now surprisingly found that the present graft copolymer is quite useful as a resinous vehicle for the base coat, giving a quick increase in viscosity after application, resulting in no turbidity or white blooming of the base coat, and which are compatible with acrylic or amino resins and excellent in storage stability. Besides that, the present coating is quite excellent in appearance and especially in the desired properties of the metallic coating as, for example, its metallic feeling, metallic whiteness, metallic mark, gloss and the like, when compared with those of heretofore proposed CAG-acrylic resin blends or grafted polymers. The present base coat can well withstand the attack of the top coating.

These characteristics are believed, up to the present day, to be due to the improved grafting rate coming from the particular steps used in the present invention.

In the present coating composition, the graft copolymer prepared by the present process is combined with a crosslinking agent.

Examples of such crosslinking agents are amino resins, polyisocyanates and other similar members customarily used in the related area. Particularly, preferred members are alkoxylated melamine formaldehyde condensation products as methoxylated methylol melamine, isobutoxylated methylol melamine, n-butoxylated methlol melamine and the like. The compounding ratio of said acrylic graft copolymer and amino resin is in general in a range of 60/40 to 90/10.

In the present coating composition for base coat use, one may use, besides said acrylic graft copolymer and amino resin, various solvents, metallic powders such as aluminum powder, coloring matter such as pigments and dyestuffs, fillers, surface conditioner (e.g. the silicon series, the acrylic resinous series ) and the like.

As the coloring matter, any of the known pigments and dyestuffs for coating use may be satisfactorily used, including metal oxides, metal hydroxides, metallic powders, metal sulfides, metal sulfates, metal carbonates, lead chromate and other salts, carbon black, organic pigments, organic dyestuffs and the like. The present coating composition may also include fillers such as silica, talc and the like and other resins than said acrylic graft copolymer and amino resin, like acrylic resins and polyester resins. The coating composition may be applied on a substrate according to a normal precedure and without being baked, and a clear coat may successfully be applied thereupon.

As the clear coat, preference is given to a thermo-setting acrylic resin type composition, however, any of the known clear top-coat compositions may be satisfactorily used providing it has good interlaminar strength to the base coating and improved weather resistance. Among them, the most preferable members are believed to be the clear coatings based on the combination of acrylic resin containing hydroxy bearing monomers and amino resins such as n-butoxylated methylol melamine, isobutoxylated methylol melamine, and methoxylated methylol melamine. However, the invention is not to be limitted to the exemplified members and other thermo-setting clear coatings such as, for example, a aminoalkyd resin base coating, may be satisfactorily used depending on the film properties required.

After application of said base coat and clear coat, the coatings are subjected to a baking operation in a usual way, whereby baked films are obtained with excellent appearance. The present technique is especially useful in automobile industry.

The invention shall be now more fully explained in the following Examples. Unless otherwise stated, all parts and percentages are by weight.

EXAMPLE 1

Into a reaction vessel fitted with a stirrer, thermometer, reflux condenser and nitrogen gas inlet, were placed 400 parts of CAB-551-0.2 (trade mark of Cellulose acetate butyrate, manufactured by Eastman Chemical Products), and 500 parts of xylene and the mixture was gradually heated. After confirming the complete dissolution of CAB, 80 parts of mono-butyl maleate, 0.8 part of dibutyltinoxide and 20 parts of xylene were added and the mixture was reacted, while stirring the reaction mixture and introducing nitrogen gas, at 145°-150° C. for 7 hours. After completion of the reaction, 720 parts of toluene, 200 parts of xylene and 720 parts of butyl acetate were added to obtain a resinous solution of Cellulose acetate butyrate having a double bonding copolymerizable with other monomer(s). When subjected to Gel-permeation chromatography (hereinafter called as GPC), the double bonding bearing cellulose acetate butyrate resin showed $h_1/h_2=2.05$, whereas the starting clellulose acetate butyrate showed $h_1/h_2=0.14$. Wherein, $h_1$ represents the height of peak measured by 254 nm UV absorption photometer for the eluent showing maximum peak by differential refractometer and $h_2$ represents the height of peak measured by a differential refractometer. The increase in UV absorbance thus detected was a clear indication of the introduction of double bonding into the cellulose acetate butyrate molecule. In the following Examples, the increase in UV absorbance due to the introduction of double bonding to cellulose acetate butyrate was measured in the same way. The resinous solution thus obtained was a clear solution having a non-volatile content of 17.0%, a viscosity of A-B and a color number of 1.

137.5 parts of said resinous solution and 7.5 parts of butyl acetate were placed in a reaction vessel fitted with a thermometer, a stirrer, reflux condenser, a nitrogen gas inlet and a dropping funnel, and the mixture was heated to 120° C. and stirred, while introducing nitrogen gas. At that stage, the following mixture of vinyl monomers and polymerization initiator was gradually added, while keeping the temperature, from the dropping funnel in 3 hours.

| | |
|---|---|
| styrene | 40 parts |
| 2-hydroxyethyl methacrylate | 16.2 |
| methacrylic acid | 1.1 |
| methyl methacrylate | 19.6 |
| n-butyl acrylate | 12.0 |
| i-butyl methacrylate | 11.1 |
| t-butyl peroxy 2-ethylhexanoate | 4 |
| total | 104 parts |

After 30 minutes from the completion of said addition, a mixed solution of 0.5 part of t-butyl peroxy-2-ethylhexanoate and 5 parts of butyl acetate was dropped in over 30 minutes and thereafter, the mixture was maintained at 120° C. for 1.5 hour. Thus obtained graft copolymer was a clear solution having a non-volatile content of 50.2%, a viscosity of $Z_2$ and color number of less than 1. When the resinous solution was applied on a glass plate and the solvent was removed, a uniform clear coating was obtained.

EXAMPLE 2

400 parts of cellulose acetate butyrate (CAB-551-0.2) and 500 parts of xylene were placed in a similar reaction vessel as stated in Example 1 and the mixture was gradually heated to melt the cellulose acetate butyrate. After comfirming the complete solution of CAB, 80 parts of dibutyl fumarate, 0.8 part of dibutyl tinoxide and 20 parts of xylene were added and the mixture was heated and stirred, while introducing a nitrogen gas stream, at 145° to 150° C. for about 7 hours. After completion of the reaction, 720 parts of toluene, 200 parts of xylene and 720 parts of butyl acetate were added to obtain a resinous solution of cellulose acetate butyrate having a double bonding coplymerizable with other monomer(s). By the GPC analysis, it was found that $h_1/h_2$ was 1.95, whereas the same ratio of the starting CAB was 0.13. The thus-obtained clear resinous solution had a non-volatile content of 17.5%, viscosity of C-D and a color number of 1.

137.5 parts of thus obtained resinous solution and 7.5 parts of butyl acetate were placed in a similar reaction vessel as used in Example 1, and the mixture was heated to 120° C. and stirred, while introducing nitrogen gas. While maintaining the same temperature, a mixture of vinyl monomers and a polymerization initiator hereinunder stated was added dropwise in at a constant speed from a dropping funnel in a period of 3 hours.

| styrene | 40 parts |
| --- | --- |
| 2-hydroxyethyl methacrylate | 16.2 |
| methacrylic acid | 1.0 |
| methyl methacrylate | 2.8 |
| n-butyl acrylate | 27.0 |
| i-butyl methacrylate | 13.1 |
| t-butyl peroxy 2-ethylhexanoate | 1.6 |
| total | 101.6 parts |

After 30 minutes from the completion of said addition, a mixed solution of 0.5 part of t-butyl peroxy 2-ethylhexanoate and 5 parts of butyl acetate was dropped in over 30 minutes and the mixture was maintained at 120° C. for 1.5 hour.

The thus-obtained graft copolymer solution was a clear solution having a non-volatile content of 50.1%, viscosity of $Z_4$ and a color number of less than 1. When the resinous solution was applied on a glass and the solvent was removed, a uniform clear coating was obtained.

EXAMPLE 3

400 parts of cellulose acetate butyrate (CAB-381-0.5) and 500 parts of xylene were placed in a similar reaction vessel as stated in Example 1 and gradually heated. After confirming the complete dissolution of CAB, 80 parts of mono-butyl maleate, 0.8 part of dibutyl tinoxide and 20 parts of xylene were added and the mixture was heated and stirred, while introducing nitrogen gas, at 145° to 150° C. for about 7 hours. After completion of the reaction, 720 parts of toluene, 200 parts of xylene and 720 parts of butyl acetate were added to obtain a resinous solution of cellulose acetate butyrate having a double bonding capable of copolymerizing with other monomers. By the GPC analysis, it was found that the $h_1/h_2$ rate was 2.04, whereas the same rate of the starting CAB resin was 0.12. The thus-obtained resinous solution was a clear solution having a non-volatile content of 17.5%, a viscosity of H-I, and a color number of 1.

137.5 parts of the thus obtained resinous solution and 7.5 parts of butyl acetate were placed in a similar reaction vessel as used in Example 1, and the mixture was heated to 120° C. and stirred while introducing nitrogen gas. While keeping the same temperature, the following mixture was added dropwise from a droppong funnel at a constant speed in a period of 3 hours.

| styrene | 40.0 parts |
| --- | --- |
| 2-hydroxyethyl methacrylate | 16.2 |
| methyl methacrylate | 30.9 |
| lauryl methacrylate | 12.9 |
| t-butyl peroxy 2-ethylhexanoate | 4.0 |
| total | 104.0 parts |

After 30 minutes from the completion of said addition, a mixed solution of 0.5 part of t-butyl peroxy 2-ethylhexanoate and 5 parts of butyl acetate was added dropwise over 30 minutes and thereafter, the mixture was maintained at 120° C. for 1.5 hours. The thus-obtained graft copolymer solution was a uniform clear solution having a non-volatile content of 50.0%, a viscosity of $Z_3$ and a color number of less than 1. When the resinous solution was applied on a glass plate and the solvent was removed, a uniform clear coating was obtained.

EXAMPLE 4

400 parts of cellulose acetate butyrate (CAB-381-0.5) and 500 parts of xylene were placed in a similar reaction vessel as stated in Example 1 and gradually heated. After confirming the complete dissolution of CAB, 80 parts of dibutyl fumarate, 0.8 part of dibutyl tinoxide and 20 parts of xylene were added and the mixture was heated and stirred, while introducing nitrogen gas, at 145° to 150° C. for about 7 hours. After completion of the reaction, 720 parts of toluene, 200 parts of xylene and 720 parts of butyl acetate were added to obtain a resinous solution of cellulose acetate butyrate having a double bonding capable of copolymerizing with other monomers. By a GPC analysis, it was found that the $h_1/h_2$ rate was 1.90, whereas the same rate of the starting CAB resin was 0.13. The thus-obtained resinous solution was a clear solution having a non-volatile content of 17.1%, a viscosity of J, and a color number of 1.

137.5 parts of thus obtained resinous solution and 7.5 parts ob butyl acetate were placed in a similar reaction vessel as used in Example 1, and the mixture was heated and stirred at 120° C. while introducing nitrogen gas. While keeping the same temperature, a following mixture was dropped in from the dropping funnel at a constant speed in 3 hours.

| styrene | 20.0 parts |
| --- | --- |
| 2-hydroxyethyl methacrylate | 16.2 |
| methacrylic acid | 1.1 |
| methyl methacrylate | 9.5 |
| i-butyl methacrylate | 50.4 |
| n-butyl acrylate | 2.8 |
| t-butyl peroxy 2-ethylhexanoate | 1.6 |
| total | 101.6 parts |

After 30 minutes from the completion of said addition, a mixed solution of 0.5 part of t-butyl peroxy 2- ethylhexanoate and 5 parts of butyl acetate was added dropwise over a period of 30 minutes and thereafter, the mixture was maintained at 120° C. for 1.5 hours. The thus-obtained graft copolymer solution was a uniform clear solution having a non-volatile content of 50.2%, a viscosity of $Z_6$ and a color number of less than 1. When the resinous solution was applied on a glass plate and the solvent was removed, a uniform clear coating was obtained.

COMPARATIVE EXAMPLE 1

50 parts of cellulose acetate butyrate (CAB-551-0.2), 62.5 parts of xylene and 62.5 parts of toluene were placed in a similar reaction vessel as stated in Example 1 and gradually heated to 120° C. After confirming the complete dissolution of CAB, the following mixture was dropped in at the same temperature and at a constant speed, from a dropping funnel in a period of 3 hours.

| | |
|---|---|
| styrene | 80.0 parts |
| 2-hydroxyethyl methacrylate | 32.4 |
| methacrylic acid | 2.2 |
| methyl methacrylate | 39.2 |
| n-butyl acrylate | 24.0 |
| i-butyl methacrylate | 22.2 |
| t-butyl peroxy 2-ethylhexanoate | 8 |
| total | 208.0 parts |

After 30 minutes from the completion of said addition, a mixed solution of 1.0 part of t-butyl peroxy 2-ethylhexanoate and 10 parts of butyl acetate was added dropwise over a period of 30 minutes and thereafter, the mixture was maintained at 120° C. for 1.5 hours. The thus-obtained graft copolymer solution was a white turbid solution having a non-volatile content of 50.0%, and a viscosity of $Z_4$. When the resinous solution was applied on a glass plate and the solvent was removed, a white turbid coating was obtained.

COMPARATIVE EXAMPLE 2

400 parts of cellulose acetate butyrate (CAB-551-0.2) and 500 parts of xylene were placed in a similar reaction vessel as stated in Example 1 and gradually heated. After confirming the complete dissolution of CAB, 80 parts of maleic anhydride, 0.8 part of dibutyl tinoxide and 20 parts of xylene were added and the mixture was heated and stirred, while introducing nitrogen gas, at 145° to 150° C. for about 10 hours. After completion of the reaction, 720 parts of toluene, 200 parts of xylene and 720 parts of butyl acetate were added to obtain a resinous solution of cellulose acetate butyrate.

By a GPC analysis, it was found that the $h_1/h_2$ rate was 0.76. whereas the same rate of the starting CAB resin was 0.13. The thus-obtained resinous solution was a clear solution having a non-volatile content of 15.2%, a viscosity of A, and a color number of 1.

137.5 parts of the thus obtained resinous solution and 7.5 parts of butyl acetate were placed in a similar reaction vessel as used in Example 1, and the mixture was heated and stirred at 120° C., while introducing nitrogen gas. While keeping the same temperature, the following mixture was added dropwise from a dropping funnel at a constant speed in a period of 3 hours.

| | |
|---|---|
| styrene | 40.0 parts |
| 2-hydroxyethyl methacrylate | 16.2 |
| methacrylic acid | 1.1 |

| -continued | |
|---|---|
| methyl methacrylate | 19.6 |
| n-butyl acrylate | 12.0 |
| i-butyl methacrylate | 11.1 |
| t-butyl peroxy 2-ethylhexanoate | 4.0 |
| total | 104.0 parts |

After 30 minutes from the completion of said addition, a mixed solution of 0.5 part of t-butyl peroxy 2-ethylhexanoate and 5 parts of butyl acetate was added dropwise over a period of 30 minutes and thereafter, the mixture was maintained at 120° C. for 1.5 hour. The thus-obtained resinous solution was a white turbid solution having a non-volatile content of 50.0%, and a viscosity of $Z_4$. When the resinous solution was applied on a glass plate and the solvent was removed, a white turbid coating was obtained.

The characteristics of the respective resins obtained in the abovesaid Examples and Comparative Examples and the film performances are shown in the following Table 1.

TABLE 1

| | Example | | | | Comp. Example | |
|---|---|---|---|---|---|---|
| | 1 | 2 | 3 | 4 | 1 | 2 |
| dried coating | ◎ | ◎ | ◎ | ◎ | X | X |
| Solubility | | | | | | |
| toluene | ◎ | ◎ | ◎ | ◎ | X | Δ |
| xylene | ◎ | ◎ | ◎ | ◎ | X | X |
| Compatibility | | | | | | |
| CAB-551-0.2 | ◎ | ◎ | ◎ | ◎ | X | X |
| ¼″ nitrocellulose | ◎ | ◎ | ◎ | ◎ | □ | □ |
| Acrydic A-801* | ◎ | ○ | ◎ | ○ | Δ | □ |
| Acrydic 44-127* | ◎ | ◎ | ○ | ○ | X | Δ | wherein:

dried coating:

A resinous solution was applied on a clear glass plate and dried at 110° C. for 1 hour. The resulting coating was evaluated by visual observation as follows:

◎ clear

○ slight clouding

□ moderate clouding

Δ white turbid

X white turbid and phase separation

Solubility:

1 g of resinous solution was taken in a test tube, mixed with 10 g of toluene or xylene and the mixture was shaken well and then placed in a stationary position at 20° C. for 24 hours. The resulting solution was evaluated according to the following standards:

◎ clear

○ slight haze

□ moderate haze

Δ haze and precipitation

X insoluble and complete phase separation

Compatibility:

Test resins were mixed together in a solid ratio fo 1:1 and then applied on a clear glass plate and dried at 110° C. for 1 hour. The film thus obtained was evaluated according to the same method as stated in the preceding paragraph "dried coating".

Acrydic A-801
  high styrene containing acrylic resin manufactured by Dainihon Ink Co.

Acrydic 44-127
  styrene free acrylic resin manufactured by Dainihon Ink Co.

EXAMPLE 5

(preparation of CAB resinous solution)

Into a reaction vessel fitted with stirrer, a thermometer, a reflux condenser and a nitrogen gas inlet, were placed 400 parts of cellulose acetate butyrate (CAB-551-0.2, trade mark, manufactured by Eastman Chemical Products) and 475 parts of xylene and the mixture was heated gradually. After confirming that the charged CAB was completely dissolved, 100 parts of mono-butyl maleic acid, 1.0 part of dibutyl tinoxide and 25 parts of xylene were added and the mixture was heated and stirred, while introducing nitrogen gas, at 145° to 150° C. for about 7 hours. After completion of the reaction, 1250 parts of toluene and 250 parts of methyl isobutyl ketone were added to obtain a resinous solution of CAB having a copolymerizable double bonding. The resinous solution thus obtained was a clear solution having a non-volatile content of 19.0%, viscosity of $A_2$ to $A_3$ and color number of 1.

EXAMPLES 6-8

Preparation of CAB macromers

Using the same procedure as stated in Example 4 with the following prescriptions shown in Table 2, various CAB resinous solutions were prepared. The characteristics of these resins are shown in Table 2.

TABLE 2

| Example No. | 6 | 7 | 8 |
|---|---|---|---|
| CAB-551-0.01 | 400 | — | — |
| CAB-531-1 | — | 400 | — |
| CAB-381-0.1 | — | — | 400 |
| monobutyl maleate | 100 | 100 | — |
| monoethyl maleate | — | — | 95 |
| dibutyl tinoxide | 1.0 | 1.0 | 1.0 |
| non-volatile content (%) | 19.0 | 19.0 | 18.5 |
| viscosity* | $A_4-A_5$ | $Z_1-Z_2$ | $A_2-A_3$ |
| color number (Gardner) | 1 | 1 | 1 |

*Gardner bubble viscometer, 25° C.

EXAMPLE 9

(Preparation of CAB resinous solution)

Into a similar reaction vessel as used in Example 5, were placed 630 parts of cellulose acetate butyrate (CAB-531-1) and 665 parts of xylene and the mixture was gradually heated to dissolve said CAB. Thereafter, 70 parts of monobutyl maleate, 0.7 part of dibutyl tinoxide and 35 parts of xylene were added and the mixture was heated and stirred, while introducing nitrogen gas, at 140° to 150° C. for about 7 hours. After completion of the reaction, the mixture was diluted with 1050 parts of toluene and 350 parts of methyl isobutyl ketone to obtain a resinous solution of cellulose acetate butyrate having a copolymerizable double bonding. The thus obtained resinous solution was a clear solution having a non-volatile content of 24%, a viscosity of $Z_5$ to $Z_6$ and a color number of 1.

EXAMPLE 10

(preparation of CAB graft acrylic resin solution)

Into a reaction vessel fitted with a thermometer, a stirrer, a reflux condenser, a nitrogen gas inlet and a dropping funnel, were placed 100 parts of CAB resinous solution obtained in Example 5, 10 parts of toluene and 10 parts of methyl isobutyl ketone and the mixture was heated and stirred, at 105° C. while introducing nitrogen gas, While maintaining the same temperature, the following mixed solution of vinyl monomers and polymerization initiator was added dropwise at a constant speed in a period of 3 hours.

| | |
|---|---|
| styrene | 10.0 parts |
| methyl methacrylate | 35.3 |
| ethyl acrylate | 38.4 |
| n-butyl acrylate | 4.0 |
| 2-hydroxyethyl methacrylate | 11.6 |
| acrylic acid | 0.7 |
| t-butyl peroxy 2-ethylhexanoate | 2.0 |
| total | 102.0 parts |

After completion of said addition, a mixture of 0.5 part of t-butyl peroxy 2-ethyl hexanoate and 20 parts of toluene was dropped in at a constant speed in a time period of 60 minutes and thereafter, the mixture was maintained at 105° C. for 1.5 hours. The thus obtained graft copolymer solution was a uniform, clear solution having a non-volatile content of 50.2%, a viscosity of $Z_2$ to $Z_3$ and a color number of less than 1.

EXAMPLES 11 TO 19

Preparation of CAB graft acrylic resin solutions

Using the same procedures as stated in Example 10 with the materials shown in Table 3, various CAB graft acrylic resin solutions 2 to 10 were prepared, whose characteristics were shown in Table 3, together with that of Example 10.

EXAMPLE 20

Preparation of CAB graft acrylic resin solution

Into a similar reaction vessel as used in Example 10, were placed 1089 parts of CAB resinous solution obtained in Example 14, 369 parts of toluene and 4 parts of methyl isobutyl ketone and the mixture was heated, while stirring and introducing nitrogen gas, to 105° C. Then the following mixed solution of vinyl monomers and polymerization initiator was dropped in at a constant speed from the dropping funnel, while keeping the temperature at 105° C., in 1.5 hour.

| | |
|---|---|
| styrene | 5.3 parts |
| methyl methacrylate | 31.5 |
| ethyl methacrylate | 7.4 |
| ethyl acrylate | 46.4 |
| 2-hydroxyethyl methacrylate | 12.6 |
| t-butyl peroxy 2-ethylhexanoate | 3.5 |
| toluene | 70.0 |
| total | 176.7 parts |

After 30 minutes from the completion of said addition, a mixture of 0.5 part of t-butyl peroxy 2-ethylhexanoate and 140 parts of toluene was dropped in at a constant speed in 1 hour. Thereafter, the whole content was allowed to cool to obtain a resinous solution, whose characteristics are shown in Table 3.

TABLE 3

| Example No. | 10 | 11 | 12 | 13 | 14 | 15 | 16 | 17 | 18 | 19 | 20 |
|---|---|---|---|---|---|---|---|---|---|---|---|
| CAB resin. solution 1 | 100 | | | | 100 | | 50 | | | | |
| CAB resin. solution 2 | | 100 | | | | 100 | | 50 | | | |

TABLE 3-continued

| Example No. | 10 | 11 | 12 | 13 | 14 | 15 | 16 | 17 | 18 | 19 | 20 |
|---|---|---|---|---|---|---|---|---|---|---|---|
| CAB resin. solution 3 | | | 100 | | | | 100 | | | 50 | |
| CAB resin. solution 4 | | | | 100 | | | | | | | |
| CAB resin. solution 5 | | | | | | | | | | | 1089 |
| Vinyl monomers | | | | | | | | | | | |
| styrene | 10.0 | 10.0 | 10.0 | | 5.0 | 5.0 | 5.0 | 5.0 | | 5.0 | 5.3 |
| methyl methacrylate | 35.3 | 28.5 | 35.3 | 44.5 | 41.5 | 41.5 | 34.3 | 36.4 | 47.7 | 29.2 | 31.5 |
| ethyl methacrylate | | 6.7 | | | | | 4.8 | 0.9 | | 10.3 | 7.4 |
| ethyl acrylate | 38.4 | 42.5 | 38.4 | 40.5 | 32.8 | 32.8 | 43.4 | 44.6 | 27.4 | 42.4 | 46.4 |
| n-butyl acrylate | 4.0 | | 4.0 | 2.7 | 8.3 | 8.3 | | | 12.0 | | |
| acrylic acid | 0.7 | 0.7 | 0.7 | 0.7 | | | | | 1.3 | | |
| methacrylic acid | | | | | 0.8 | 0.8 | 0.8 | 1.5 | | 1.5 | |
| 2-hydroxyethyl-methacrylate | 11.6 | 11.6 | 11.6 | 11.6 | 11.6 | 11.6 | 11.6 | 11.6 | 11.6 | 11.6 | 12.6 |
| poly. initiator | | | | | | | | | | | |
| t-butyl peroxy-2-ethylhexanoate | 2.0 | | 1.0 | 2.0 | 1.0 | 2.0 | 2.0 | 1.0 | | 2.0 | 3.5 |
| azobisisobutylonitrile | | 0.9 | | | | | | | 0.9 | | |
| Solvents | | | | | | | | | | | |
| toluene | 30 | 30 | 30 | 30 | 30 | 30 | 30 | 56.7 | 56.7 | 56.7 | 509 |
| methyl isobutyl ketone | 10 | 10 | 10 | 10 | 10 | 10 | 10 | 13.3 | 13.3 | 13.3 | 4 |
| non-volatile content % | 50.2 | 50.0 | 50.8 | 50.2 | 51.2 | 50.0 | 51.0 | 50.5 | 49.8 | 50.0 | 21.0 |
| viscosity | $Z_2-Z_3$ | $Z-Z_1$ | over $Z_6$ | $Z-Z_1$ | $Z_5-Z_6$ | U-V | $Z_6$ | $Z_1-Z_2$ | Y-Z | $Z_2-Z_3$ | $Z_3$ |
| acid value (mgKOH/g solid) 13 | 13 | 13 | 13 | 13 | 13 | 13 | 13 | 13 | 13 | 5 | |
| OH value (mg KOH/g solid) | 50 | 50 | 50 | 50 | 50 | 50 | 50 | 50 | 50 | 50 | 53 |
| color number (Gardner) | 1 | 1 | 1 | 1 | 1 | 1 | 1 | 1 | 1 | 1 | 1 |

COMPARATIVE EXAMPLE 3

Into a reaction vessel fitted with a stirrer, a thermometer, a reflux condenser, a nitrogen gas inlet and a dropping funnel, were placed 30 parts of toluene and 10 parts of methyl isobutyl ketone and the mixture was heated and stirred, at 105° C. while introducing nitrogen gas. Then, 102 parts of the mixed solution of vinyl monomers and polymerization initiator shown in Example 10 were dropped in at a constant speed from a dropping funnel, while keeping the temperature at 105° C., for 3 hours.

After 30 minutes from the completion of said addition, a mixture of 0.5 part of t-butyl peroxy 2-ethylhexanoate and 20 parts of toluene was added dropwise at a constant speed in a period of 60 minutes. After completion of said addition, the mixture was maintained at 105° C. for 1.5 hour. To this, a solution of 16 parts of CAB-551-0.2 in a mixture of 20 parts of xylene, 26 parts of toluene and 10 parts of methyl isobutyl ketone was added while maintaining the temperature at 105° C. and stirred for 30 minutes and allowed to cool. The characteristics of the thus obtained varnish and resin are shown in the following Table 4.

COMPARATIVE EXAMPLE 4

Into a similar reaction vessel as used in Comparative Example 3, were placed 16 parts of CAB-551-0.2, 20 parts of xylene, 56 parts of toluene and 20 parts of methyl isobutyl ketone, and the mixture was, while introducing nitrogen gas, gradually heated to 105° C. At this stage, 102 parts of the mixed solution of monomers and polymerization initiator shown in Example 10 were dropped in from a dropping funnel at a constant speed in a period of 3 hours.

After 30 minutes from the completion of said addition, a mixture of 0.5 part of t-butyl peroxy 2-ethylhexanoate and 20 parts of toluene was added at a constant speed in a period of 60 minutes. After completion of said addition, the mixture was maintained at 105° C. for 1.5 hours and then allowed to cool. The characteristics of thus obtained varnish and resin are shown in Table 4.

COMPARATIVE EXAMPLE 5

Into a reactor, were placed 400 parts of cellulose acetate butyrate (CAB-551-0.2) and 475 parts of xylene and the mixture was gradually heated to dissolve the CAB. After confirming the complete dissolution of CAB, 100 parts of maleic anhydride, 1.0 part of dibutyl tinoxide and 25 parts of xylene were added and the mixture was heated and stirred, while introducing nitrogen gas, at 145° to 150° C. for about 10 hours. Thereafter, the mixture was mixed with 1250 parts of toluene and 250 parts of methyl isobutyl ketone to obtain a resinous solution, which was clear and had a non-volatile content of 20%, a viscosity of C and a color number of 1.

100 parts of the thus obtained resinous solution were placed in, together with 10 parts of toluene and 10 parts of methyl isobutyl ketone, a similar reaction vessel as used in Comparative Example 3, and while introducing nitrogen gas, was heated and stirred. At the stage when the temperature reached 105° C., there was added dropwise 102 parts of a mixed solution of vinyl monomers and a polymerization initiator as shown in Example 10, at 105° C. over a period of 3 hours. After 30 minutes from the completion of said addition, a mixture of 0.5 part of t-butyl peroxy 2-ethyl hexanoate and 20 parts of toluene was added dropwise at a constant speed in a period of 60 minutes. Thereafter, the mixture was maintained at 105° C. for 1.5 hours and allowed to cool. The characteristics of thus obtained varnish and resin are shown in Table 4.

TABLE 4

| Comparative Example No. | 3 | 4 | 5 |
|---|---|---|---|
| non-volatile content % | 50 | 50 | 50 |
| viscosity (Gardner, bubble viscometer 25° C.) | $Z-Z_1$ | $Z_1-Z_2$ | $Z_2$ |
| acid value (mg KOH/g solid) | 5 | 5 | 15 |
| OH value (mg KOH/g solid) | 50 | 50 | 50 |
| color number (Gardner) | 1 | 1 | 1 |

REFERENCE EXAMPLE 1

Preparation of acrylic resin for clear coat use.

Into a reaction vessel fitted with a stirrer, a thermometer, a reflux condenser, a nitrogen gas inlet and a dropping funnel, were placed 44 parts of xylene, 10 parts of n-butanol and 20 parts of Solvesso 100 (trade mark of aromatic petroleum solvent, manufactured by Esso Standard), and the mixture was heated and stirred, while introducing nitrogen gas. At the stage when the temperature reached 120° C., the following mixed solution of vinyl monomers and polymerization initiator was dropped in from the dropping funnel at a constant speed, while maintaining the same temperature, in a period of 3 hours.

| styrene | 30 parts |
| --- | --- |
| n-butyl methacrylate | 32.1 |
| lauryl methacrylate | 18.6 |
| 2-hydroxyethyl methacrylate | 16.2 parts |
| methacrylic acid | 3.1 |
| azobisisobutyronitrile | 2 |
| total | 102 parts |

After 30 minutes from the completion of said addition, a mixture of 0.5 part of t-butyl peroxy 2-ethylhexanoate and 5 parts of xylene was added dropwise at a constant speed in a period of 30 minutes. Thereafter, the mixture was maintained at 120° C. for 1.5 hours and then allowed to cool. The thus obtained acrylic resinous solution had a non-volatile content of 55.0%, a viscosity of W and a color number of less than 1.

REFERENCE EXAMPLE 2

Preparation of acrylic resinous solution for base coat use.

Into a reaction vessel fitted with stirrer, a thermometer, a reflux condenser, nitrogen a gas inlet and a dropping funnel, were placed 40 parts of toluene and 10 parts of methyl isobutyl ketone and the mixture was heated and stirred while introducing a nitrogen gas stream. At the stage when the temperature reached 105° C., the mixed solution of the following vinyl monomers and polymerization initiator was added dropwise at a constant speed while maintaining the same temperature in a period of 3 hours.

| styrene | 10.0 parts |
| --- | --- |
| methyl methacrylate | 21.4 |
| ethyl acrylate | 40.6 |
| ethyl methacrylate | 14.0 |
| 2-hydroxyethyl methacrylate | 12.0 parts |
| acrylic acid | 2.0 |
| t-butyl peroxy 2-ethylhexanoate | 1.0 |
| total | 101.0 parts |

After 30 minutes from the completion of said addition, a mixture of 0.4 part of t-butyl peroxy 2-ethylhexanoate and 15 parts of toluene was added dropwise at a constant speed in a period of 60 minutes and thereafter maintained at 105° C. for 1.5 hours. The mixture was then diluted with 35 parts of toluene and allowed to cool. The thus-obtained acrylic resin solution had a non-volatile content of 50.0%, a viscosity of Y-Z and a color number of less than 1.

EXAMPLE 21

CAB graft acrylic resin and other components shown in the following Table 5 were taken in a tin and mixed well with disper for 15 minutes, thereby obtaining the respective metallic base paints A to K.

TABLE 5

| Paint | A | B | C | D | E | F | G | H | I | J | K |
| --- | --- | --- | --- | --- | --- | --- | --- | --- | --- | --- | --- |
| Ex .No. for the CAB graft acrylic resin used | 10 | 11 | 12 | 13 | 14 | 15 | 16 | 17 | 18 | 19 | 20 |
| CAB graft acrylic resin solution | 160 | 160 | 160 | 160 | 160 | 160 | 160 | 160 | 160 | 160 | 55 |
| U-van 20SE60[1] | 33 | 33 | 33 | 33 | 33 | 33 | 33 | 33 | 33 | 33 | 33 |
| Alpaste 1109 MA[2] | 15 | 15 | 15 | 15 | 15 | 15 | 15 | 15 | 15 | 15 | 15 |
| toluene | 10 | 10 | 10 | 10 | 10 | 10 | 10 | 10 | 10 | 10 | 10 |
| ethyl acetate | 5 | 5 | 5 | 5 | 5 | 5 | 5 | 5 | 5 | 5 | 5 |
| n-butanol | 5 | 5 | 5 | 5 | 5 | 5 | 5 | 5 | 5 | 5 | 5 |
| Modaflow[3] | 0.2 | 0.2 | 0.2 | 0.2 | 0.2 | 0.2 | 0.2 | 0.2 | 0.2 | 0.2 | 0.2 |
| acrylic resin solution[4] | | | | | | | | | | | 138 |

[1]melamine resin manufactured by Mitsuitohatsu
[2]aluminum pigment manufactured by Toyo Aluminum
[3]levering agent manufactured by Monsanto
[4]Acrylic resin solution for base coat use, prepared by the method of Ref. Example 2

Next, a clear paint was prepared by using the materials shown below and mixing them by disper for 15 minutes.

| acrylic resin solution[5] | 140 parts |
| --- | --- |
| U-van 20 SE 60 | 50 |
| Solvesso 150[6] | 20 |
| n-butanol | 5 |
| UV absorber | 1 |
| Modaflow | 0.2 |

[5]acrylic resin solution for clear coat use prepared by Ref. Example 1
[6]aromatic solvent, manufactured by Esso Standard A series of test pieces were prepared by using zinc phosphated dull steel plates (each 0.8×300×300 mm) and subjecting them in sequential order, to a cationic electrodeposition, an inter coat application and sanding. Onto the test pieces thus obtained, the respective metallic base paint previously added with a mixed solvent of toluene:ethyl acetate:Solvesso 150 (5:3:2) to adjust the viscosity to 14 seconds by a #4 Ford Cup was applied to give a wet thickness of 20 microns by 2 stages and 1 minute interval application method. For this coating, was used an automatic applicator fitted with wider 61. The atomizing pressure was 4 Kg/cm$^2$ and the booth atmosphere was maintained at a temperature of 25±2° C. and a humidity of 75±%. After 3 minutes setting in the booth atmosphere, a clear paint previously adjusted to a viscosity of 27 seconds by a #4 Ford Cup with a mixed solvent of Solvesso 100:Solvesso 150 (2:1) was applied so as to give a wet thickness of 35 microns. This was then allowed to set for 5 minutes and baked at 140° C. for 20 minutes. The film properties of the thus obtained coating are shown in the following Table 6.

TABLE 6

| metallic paint | A | B | C | D | E | F | G | H | I | J | K |
|---|---|---|---|---|---|---|---|---|---|---|---|
| Appearance | | | | | | | | | | | |
| 60° gloss * | 96 | 97 | 96 | 97 | 97 | 97 | 96 | 94 | 94 | 94 | 97 |
| metallic feeling * | ◎ | ◎ | ◎ | ◎ | ◎ | ◎ | ◎ | ◎ | ◎ | ◎ | ◎ |
| L value * | 67.5 | 67.7 | 67.6 | 67.8 | 67.9 | 67.6 | 67.3 | 66.4 | 66.5 | 66.5 | 67.8 |
| metal mark * | ◎ | ◎ | ◎ | ◎ | ◎ | ◎ | ◎ | ◎ | ◎ | ◎ | ◎ |
| visual appearance * | ◎ | ◎ | ◎ | ◎ | ◎ | ◎ | ◎ | ◎ | ◎ | ◎ | ◎ |
| 240 hrs. humidity test blister | 10 | 10 | 10 | 10 | 10 | 10 | 10 | 10 | 10 | 10 | 10 | wherein * marks represent the following:
60° gloss. 60° mirror reflectance by JIS-K-5400
mettalic feeling. visual observation
L value whiteness by Hanter's color indication the bigger the number, the whiter the color and the more the metallic feeling
metallic mark aluminum arrangement on the whole surface was checked by naked eyes
blister gloss and smoothness were judged by visual observation by 10 point system Metallic feeling, metal irregularity and visual appearance were judged according to the following standards
◎ quite excellent
○ excellent
Δ somewhat no good
x no good

COMPARATIVE EXAMPLE 6

Metallic base paints L, M and N were prepared as in Example 21 excepting CAB graft acrylic resin solutions obtained in Comparative Examples 3 to 5 was used. The similar tests as given in Example 21 were repeated with these base paints and the following results were obtained.

TABLE 7

| metallic paint | L | M | N |
|---|---|---|---|
| 60° gloss | 92 | 93 | 92 |
| metallic feeling | Δ | Δ | Δ |
| L value | 62.2 | 62.3 | 61.6 |
| metallic mark | Δ | Δ | Δ |
| visual appearance | ○ | ○ | ○ |
| blister | 10 | 10 | 10 |

What is claimed is:

1. A method for preparing graft copolymer comprising reacting cellulose ester with mono- or di-ester of maleic or fumaric acid, and copolymerizing thus obtained cellulose derivative bearing copolymerizable double bonding with other polymerizable monomer(s).

2. The method according to claim 1 wherein the cellulose ester is selected from cellulose acetate butyrate, cellulose acetate and cellulose acetate propionate.

3. The method according to claim 2 wherein the cellulose ester is cellulose acetate butyrate.

4. The method according to claim 1 wherein the mono- or di-ester of maleic or fumaric acid are selected from the group consisting of mono-methyl maleate, mono-ethyl maleate, mono-butyl maleate, 2-ethyl-hexyl maleate, dimethyl maleate, diethyl maleate, dibutyl maleate, di-2-ethyl-hexyl maleate, dimethyl fumarate, diethyl fumarate, dibutyl fumarate, di-2-ethylhexyl fumarate and the like.

5. The method according to claim 1 wherein the other polymerizable monomer comprises 50% by weight and more of methacrylic ester or acrylic ester.

6. The method according to claim 1 wherein other polymerizable monomer is vinyl monomer having $\alpha,\beta$-ethylenically unsaturation bonding.

7. The method according to claim 1 wherein the weight ratio of said cellulose derivative bearing copolymerizable double bonding to said other polymerizable monomer is in a range of 1–95 wt% to 99–5 wt%.

8. Resinous solution prepared by the method substantially described in claim 1.

* * * * *